Jan. 6, 1942.  C. B. SHANLEY  2,268,676
MOLDING CORE
Filed Nov. 20, 1939   2 Sheets-Sheet 1

INVENTOR
CONNOR B. SHANLEY
BY
ATTORNEY

Jan. 6, 1942.  C. B. SHANLEY  2,268,676
MOLDING CORE
Filed Nov. 20, 1939  2 Sheets-Sheet 2

INVENTOR
CONNOR B. SHANLEY
BY
ATTORNEY

Patented Jan. 6, 1942

2,268,676

UNITED STATES PATENT OFFICE 2,268,676

MOLDING CORE

Connor B. Shanley, Kirkwood, Mo.

Application November 20, 1939, Serial No. 305,244

5 Claims. (Cl. 75—171)

This invention relates generally to the production of metallic castings. More particularly, my invention relates to a certain new and useful improvement in molding cores and has for its primary object the provision of a molding core having a relatively hard, firm, and re-enforced sand or other porous body so uniquely equipped with efficient venting means as to enable the production of castings of uniform excellent characteristics.

And with the above and other objects in view, my invention resides in the novel features of form, construction, arrangement, and combination of parts presently described and pointed out in the claims.

In the accompanying drawings (2 sheets),

Figure 1:
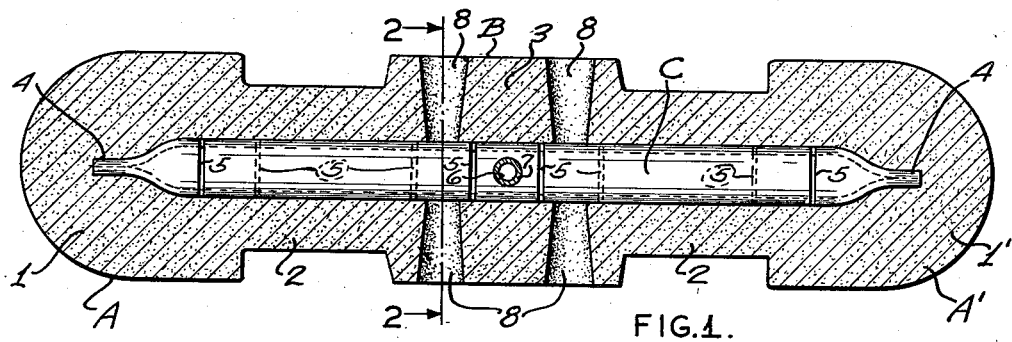
Figure 1 is a longitudinal sectional view of a molding core constructed in accordance with and embodying my present invention.
Figure 2:
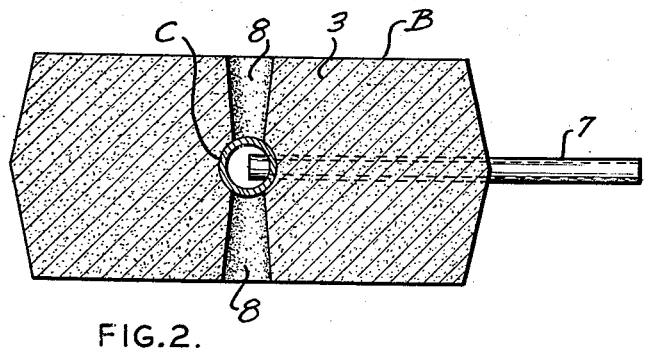
Figure 2 is a transverse sectional view of the core, taken approximately along the line 2—2, Figure 1.
Figure 3:
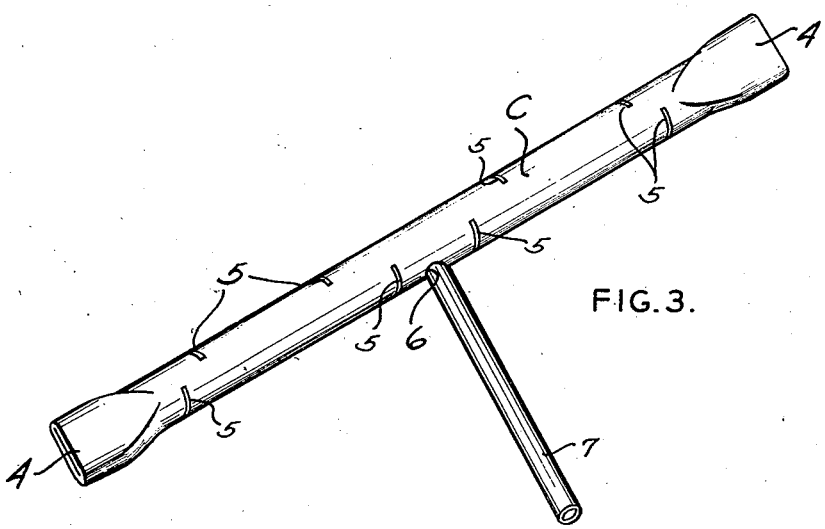
Figure 3 is a perspective view of the venting and strengthening means of the core.
Figure 4:
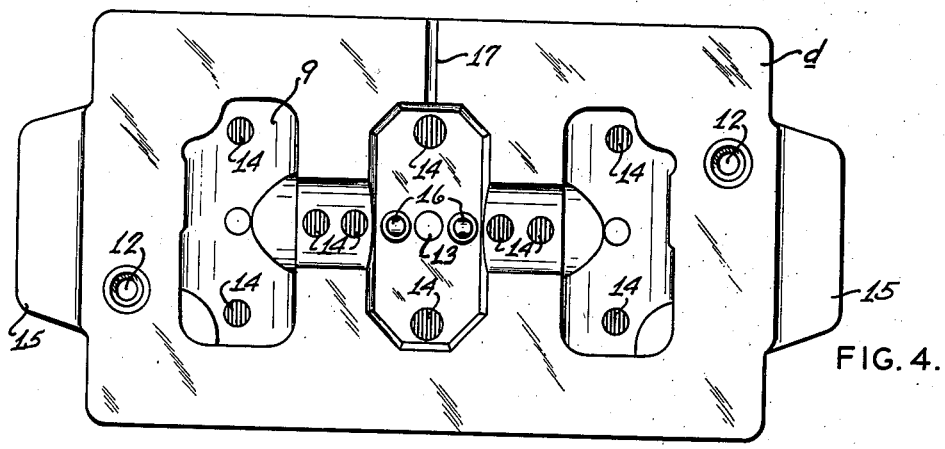
Figures 4 and 5 are plan views of, respectively, the upper and lower companion members of a box for the production of a core of my invention.
Figure 5:
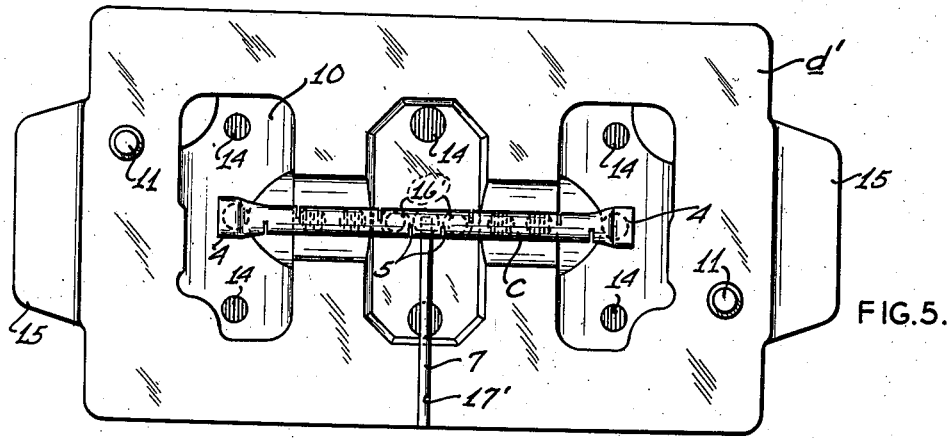
Figure 6:
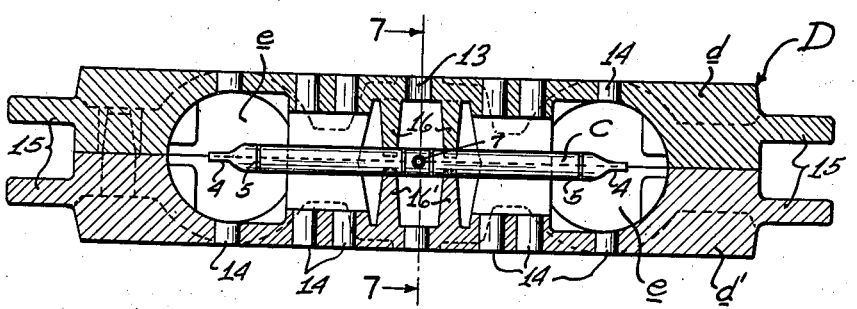
Figure 6 is a longitudinal sectional view of the box-members and strengthening and venting means in assembled relation for the production of a core of my invention.
Figure 7:
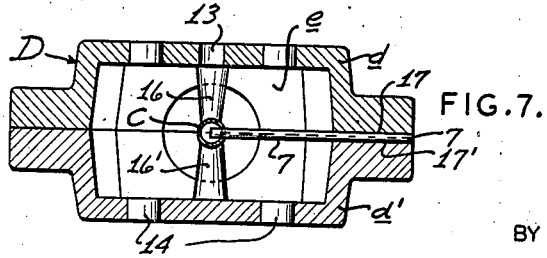
Figure 7 is a transverse sectional view of the assembled box-members and core strengthening and venting means, taken approximately along the line 7—7, Figure 6.

For present descriptive purposes and as illustrating merely a specimen core produced according to and embodying my invention, the sand core shown in Figures 1 and 2 is designed especially for use in a so-called multiple cavity mold and, in the present instance, includes, as shown, similarly shaped or like porous members A, A', contoured to meet the desired configuration of the interior of two ultimately individual castings, the core members A, A', comprising end-portions 1, 1', respectively, integrally joined by oppositely extending arms 2 of suitable cross-section to an intermediate core-print B comprising a central so-called stabilizing portion 3 suitably enlarged with respect to the arms 2 for communication with the exterior of the particular mold, all for purposes presently fully appearing.

Forming part of the core, and housed or embedded in and extending axially through the arms 2 and into the core-members A, A', is a venting and strengthening or re-enforcing member C constructed of relatively light-gauge metallic tubing and preferably pinched upon itself and thereby flattened at its opposite ends in the provision of so-called stabilizing fins 4.

Such fins 4 provide so-called inlet orifices into the member or tube C, and intermediate its ends, the member C is also provided transversely with a plurality of somewhat circumferentially staggered arc-shaped orifices or kerfs, as at 5, while midway its ends, the member C is also provided with a relatively small circular opening 6 for removably or detachably accommodating the inner end of a vent tube 7 adapted, when in such communication with the interior of the tube C, to extend outwardly at right angles to the longitudinal axis of the tube C through the core-print B, substantially as shown and for purposes presently fully appearing.

Formed in the core-print B to extend inwardly from its outer face or exterior to the embedded tube C, is preferably a plurality of inwardly tapering channels 8 formed during the building of the core, as will presently fully appear, by opposed tube-centering lugs in the members of the core box. It may here be observed that, inasmuch as the channels 8 are located wholly within the confines of the core-print B, such channels 8 do not in any way affect the ultimate casting or castings, but do, in fact, greatly facilitate the venting of the core.

The particular external shape, contour, and configuration of the core may, of course, be varied in accordance with the particular casting pattern. The present core, which comprises essentially a porous body of desired configuration including a member A or a plurality of such members A, A', and a print B and a suitably centered and embedded venting member C, in practice, is preferably constructed or built up in a two-part core box D including upper and lower companion or matching sections $d$, $d'$, which are provided with suitably contoured core-forming or complementary chambers or cavities, as at 9, 10, respectively, adapted, when the box-sections $d$, $d'$, are in superposed box relation to form the particular complete core-molding cavity, indicated generally as $e$, the one or lower section $d'$ being provided with a plurality of upstanding dowels or lugs 11 for precise, accurate positioning engagement in complementary recesses 12 formed in the companion or upper section $d$. The box-sections $d$, $d'$, are also conventionally provided with a plurality of sand inlet openings 13 and air outlet grids 14 opening at one end upon the outer face of the particular section and at the other end communicating with the mold cavity e. For convenience in handling and manipulation, the box-sections d, d', are further conventionally formed with outwardly projecting handles or grips 15, as shown.

Formed in the print-forming or, in the present instance, central, portion of the core-box sections d, d', is a plurality of opposed lugs or so-called pedestals 16, 16', preferably of tapering configuration in the nature of a cone-frustrum, arcuately ground off at their opposed tips, as shown, for supporting engagement with the venting and strengthening tube C. In this connection, it may be stated that the lugs 16 of the box-section d are so arranged or positioned with respect to the lugs 16' of the companion box-section d' so as to more or less match and engage the tubular member C on opposite sides in axially aligned pairs and sized to so support the member C that its longitudinal axis will lie substantially in the center or parting plane of the box-sections d, d'. Such particular opposed or paired location of the lugs 16, 16', is, however, by no means essential, it being required only that said lugs or pedestals of the respective box-sections d, d', be located well within the confines of the print-forming portion of the core-box cavity e, so that the resulting, in the present instance, tapering recesses 8 will, in turn, be located within the core-print B and not interfere with the molten metal during pouring or casting formation.

The abutting faces of the companion box-sections d, d', are further provided with complementary grooves or channels 17, 17', preferably of semi-circular cross-section so located and positioned at right angles to the longitudinal axis of the core-forming cavity e for accommodating the auxiliary venting tube 7.

Now, in forming or building a core, a strengthening and venting tube C may be suitably placed and centered upon the lugs or pedestals 16' of a box-section d' and an auxiliary venting tube 7 manually inserted at its one end into the opening or aperture 6 and disposed lengthwise within the marginal channel 17'. The companion box-section d is then placed upon the section d' in the usual manner, and the closed core-box D, with the positioned tube C firmly held between the opposed lugs 16, 16', placed within the jaws of a conventional molding machine (not shown), which pneumatically forces molding sand at high pressure into the core-forming cavity e through the sand inlet openings 13. The displaced air is forced outwardly through the grids 14 and also from the tube C outwardly through the auxiliary venting tube 7 to the exterior of the cavity e, the venting member C and its auxiliary tube 7 thus functioning as an auxiliary air eduction passage not only accelerating the speed with which the sand may be forced into the mold-cavity e, but also effecting the compacting of the admitted sand more firmly and strongly about the positioned tube C and thereby materially increasing the structural rigidity and strength in the finished core.

After the core-forming cavity e has been completely filled, the core-box D is removed from the core-molding machine and opened for core removal, and it may be stated that, during such entire removal operation, the auxiliary venting tube 7 may be permitted to remain in place and may only be removed after the finished core has been disposed in its supporting pan for introduction into the baking oven, so that any danger of blocking the vent-passage formed thereby in the finished core will be substantially eliminated. In fact, if desired, the auxiliary venting tube 7 may even be left in the core during the baking operation to insure against accidental collapse or blockage of the core-venting passage formed thereby in the core, the finally baked and vented core being firm and hard and the core-portions 1, 1', relatively strengthened by the flattened and somewhat spatulate formation of the end-portions of the tube C.

Hence, on a mold equipped with a core constructed in accordance with my present invention being poured, the gases resulting from the inflowing hot metal will readily find escape and pass through the porous sand body of the core, through the several inlet orifices into the tubular venting member C, and thence through the venting passage resulting from the previous removal of the auxiliary venting tube 7 to the ambient exteriorly of the flask.

The particular casting-formation being completed, the print B is readily broken to separate the two castings resulting from the core-members A, A', when the tube C may be easily recovered for repeated use.

By reason of its relatively large internal volumetric capacity, the tube C adds immeasurably to the venting characteristics of the core and enables an outflowing stream of gases through the vent passage under considerable pressure. Cores so formed are substantially uniform and result in the formation of excellent castings free of vent-forming nails or other foreign members and of correspondingly uniform gas-free characteristics. Further, the member C, by reason of its tubular shape, imparts unusual strength to the core, while at the same time reducing the weight thereof. In addition, plugging up of vent-openings is obviated, and the employment of nails, wire, or other core supports that might contaminate the sand pile is wholly eliminated.

It should be understood that changes and modifications in the form, construction, arrangement, and combination of the several parts of the core may be made and substituted for those herein shown and described without departing from the nature and principle of my invention.

Having thus described my invention, what I claim and desire to secure by Letters Patent is:

1. A molding core comprising a porous body including a portion contoured to meet molding requirements and a print-portion, and a tubular member embedded wholly within the core and deformed at its opposite ends to provide lengthwise extending fin-like portions for increasing the strength of the bond between the core and the tubular member, said member having a plurality of fluid inlet openings and an outlet opening, the latter for communication through the print-portion with the exterior of the body.

2. A molding core comprising a porous body including a portion contoured to meet molding requirements and a print-portion, a tubular member embedded wholly within the core and deformed at its opposite ends to provide lengthwise extending fin-like portions, each having a narrow slot-like diametrally extending vent opening for permitting air and other gases to flow from the porous body into the tubular member, and a venting member having communication with the tubular member intermediate its ends and projecting through the print-portion of said body for venting the tubular member to atmosphere.

3. A molding core comprising a porous body including a portion contoured to meet molding requirements and a print-portion, a tubular member embedded wholly within the core and deformed at its opposite ends to provide lengthwise extending fin-like portions, each having a narrow slot-like diametrally extending vent opening for permitting air and other gases to flow from the porous body into the tubular member, and a venting member having communication with the tubular member intermediate its ends and projecting through the print-portion of said body for venting the tubular member to atmosphere, said tubular member being provided intermediate its flattened end portions with a plurality of axially spaced slots disposed at right angles to the longitudinal axis of the tubular member and extending partially around the circumference thereof.

4. A sand-molding core venting and reinforcing member comprising an elongated tubular member deformed at its opposite ends to provide lengthwise extending fin-like portions, each having a narrow slot-like diametrally extending opening and said tubular member being provided intermediate its said end portions with a plurality of axially spaced slots disposed at right angles to its longitudinal axis and extending partially around the circumference thereof.

5. Sand-molding core venting and reinforcing means comprising an elongated tubular member deformed at its opposite ends to provide lengthwise extending fin-like portions, each having a narrow slot-like diametrally extending opening and said tubular member being provided intermediate its said end portions with a plurality of axially spaced slots disposed at right angles to its longitudinal axis and extending partially around the circumference thereof, and a second tubular member having communicating engagement at one end with the first tubular member at a selected location intermediate the ends thereof.

CONNOR B. SHANLEY.